United States Patent [19]

Jorgensen

[11] Patent Number: 4,876,555
[45] Date of Patent: Oct. 24, 1989

[54] RESONANCE LABEL AND METHOD FOR ITS FABRICATION

[75] Inventor: Paul R. Jorgensen, Almunecar, Spain

[73] Assignee: Durgo AG, Switzerland

[21] Appl. No.: 168,468

[22] Filed: Mar. 15, 1988

[30] Foreign Application Priority Data

Mar. 17, 1987 [CH] Switzerland .......................... 1000/87

[51] Int. Cl.⁴ .......................... G08B 13/24; H01Q 1/38
[52] U.S. Cl. ...................................... 343/895; 29/846; 333/175; 340/572
[58] Field of Search .......................... 343/895, 700 MS; 340/572; 333/175, 185, 219, 138, 140, 167; 29/846

[56] References Cited

U.S. PATENT DOCUMENTS

4,598,276  7/1986  Tait ..................................... 343/895
4,689,636  8/1987  Tait et al. ............................ 343/895

Primary Examiner—Rolf Hille
Assistant Examiner—Michael C. Wimer
Attorney, Agent, or Firm—Ostrolenk, Faber, Gerb & Soffen

[57] ABSTRACT

For carrying out the deactivation at a lower current and with greater reliability, at least one continuous hole (11) which can be made, for example, by means of a needle roll is provided in the insulating layer (1) of a resonance label in the region (10) between two conducting layers (2, 3).

24 Claims, 2 Drawing Sheets

RESONANCE LABEL AND METHOD FOR ITS FABRICATION

BACKGROUND OF THE INVENTION

The invention relates to a resonance label and to a process for the production thereof.

It is known to use resonance labels for providing protection from theft in department stores, supermarkets and the like. Such are attached to the goods to be protected and have to be deactivated at the checkout to avoid triggering a burglar alarm at the exit. For deactivation, a strong surge current is induced in the resonance label which constitutes an oscillating circuit, the said surge current virtually producing a short-circuit (for example according to U.S. Pat. No. 3,624,631). This requires enormous fields which on the one hand, in view of the general proximity of the checkout and exit, may lead to undesired mutual effects and to false alarms and, on the other hand, is also energy-consumptive. Weaknesses in the circuit tracks also have an adverse effect on the quality Q of the oscillating circuit.

In the past, attempts have therefore been made to reduce, as far as possible, to reduce the energy required for deactivation. This is achieved either by a complicated label structure having two different oscillating circuits (for example according to U.S. Pat. No. 3,810,147) or by another obvious measure (which was also taken for other reasons) and which is comprised of making the insulating layer, which is generally identical to the base, as thin as possible. However, the aforementioned approaches have their limits.

To further reduce the energy required for deactivation, U.S. Pat. No. 4 567 473 proposes introducing a notch at one point, in particular in the region of the capacitor plates, after production of the label. However, introducing such a notch of predetermined depth into a substrate which is only a few hundredths of a millimeter thick is an extremely difficult undertaking. In fact, highly variable coil qualities are obtained in practice, since either the conducting layer is drawn to varying depths into the insulating layer with the cut or—since the insulating layer is under tension during the process—left the surface of the incision exposed, so that now a higher deactivation energy is actually required in order to, so to speak, draw a spark around the corner.

Hence, there is on the market another embodiment in which the label, after its production, is subjected to localized pressure in the region of the conducting layers which are opposite one another and separated only by the insulating layer, so that the dielectric becomes thinner in localized areas as a result of the compression. This is generally carried out using an embossing roll which compresses an area of the magnitude of a square millimeter. This has further disadvantages. Fluctuations in the thickness of the various layers of the manufactured label have a considerable effect on the reduction in thickness of the dielectric finally achieved. If the distance is too large, the deactivating field is not sufficient to fulfill its purpose. However, if the distance is too small, the label may be deactivated during recognition in the system. Furthermore, the relatively large thinner area is sufficient to have a strong influence on the resonance frequency of the oscillating circuit, making it more difficult to set the resonance frequency to a predetermined value or at least to a narrower frequency range. This situation is further aggravated by the fact that the only dielectric used in such labels to date was polyethylene, whose thickness is relatively large and in the range from about 26–30 $\mu$m, and which is to be brought to 5–8 $\mu$m by the embossing procedure.

Although other materials, such as polystyrene or polypropylene, are thinner and would in principle be more suitable for capacitor formation, they have a very small dielectric loss factor which, particularly in this known type of label, leads to problems with deactivation.

In summary, it may thus be stated that all attempts to date to reduce the field strength required for deactivation, by means of selective reducing of the thickness of the insulating layer, have been unsatisfactory since they have led to hither rejection rates. However, the above description of the prior art also shows that substantial attempts to overcome the problem have been made without success.

SUMMARY OF THE INVENTION

It is therefore an object of the invention to provide a resonance label of the type stated at the outset which is so designed that, on the one hand, a substantial reduction in the field strength required for deactivation is achieved and, on the other hand, the deactivation achieved is fault-free and permanent, and furthemore, if possible, the effect on the resonance frequency is limited or predictable.

The aforementioned and other objects of the invention have been achieved in a surprisingly simple manner. By the arrangement of a continuous cut or hole (a plurality, for example two or three, are also possible) in the insulating layer, a localized but defined inhomogeneity is incorporated, i.e. the dielectric constant is substantially altered in a defined area and decreases, for example, from a value of 2.3–2.5 to 1 (for air). As a result of the perforation (for the purposes of the invention, "hole" or "perforation" is always understood below as also meaning a cut), a clear path is provided for the discharge and it need not first—as previously—follow a path through the molecular structure, since the deactivation spark takes the shortest route between the two conducting layers opposite one another, or the path with the lowest electrical resistance. Effects such as fluctuations in thickness—as in the known embossing procedure—are absent in the present invention. Furthermore, cutting or perforation is not comparable with the previous methods in that it has been found in practice that the deactivation takes place in a much more reliable manner than in the past, i.e. it is impossible for the label to remain resonant after the deactivating surge current, despite a substantially reduced deactivating current. In initial experiments, this result appeared confusing and it was only when incisions were made through the material that it was found that the conducting layer vaporizes in each of the holes and forms a uniform coating along the hole wall, the said coating ensuring a permanent short-circuit. This connection is so firm and secure that it is not detached even by movements and flexing—for example when the label is incorporated in a shoe sole—which in fact could occur with the frequently irregular and small spark gap, which results on short-circuit due to a dielectric distance which has become shorter as a result of an incision or by embossing.

Another advantage is that it is now also possible to use materials which previously presented difficulties during deactivation, namely polypropylene and polystyrene, as well as the cheap polyethylene, which can now be used in this form in constructing the resonance label.

It has been found that, under certain preconditions, for example twice the current required for excitation is sufficient to carry out deactivation, in particular one of the dependent claims is realized. In principle, it is in fact also possible to perforate at least one conducting layer whose hole edges are adjacent to the other layer (or its hole edges) without dielectric in between. It is merely necessary to ensure that perforation does not result in any metal fragments passing through the hole. If the perforating tools are heated, the dielectric even shrinks slightly after the perforation procedure, so that the conducting layers (e.g. aluminum) are adjacent to one another in the region of the hole.

In resonance labels, the so-called "Q factor" plays an important role. The Q factor depends not only on the quality of the dielectric but also on the space inside the inductor winding which is free of conductive coating. For a predetermined length of the conductor tracks of the inductor, this free space is generally further reduced by the capacitor to be housed therein. Hence, the smaller the capacitor area (because of a very thin dielectric), the larger the free space and hence the better the quality of the label. However, this Q factor decreases if the hole area is chosen too large. On the other hand, deactivation is facilitated by a very substantial hole. Thus, there are contradictory requirements here which are best achieved by the features presented in the claims herein.

The features of another one of the claims are provided for the production of the label according to the invention.

BRIEF DESCRIPTION OF THE DRAWINGS

Further details of the invention are given in the following descriptions of an embodiment shown schematically in the drawing to illustrate the resonance label according to the invention and the process for its production. Accordingly.

DETAILED DESCRIPTION OF THE DRAWINGS

Figure 1:
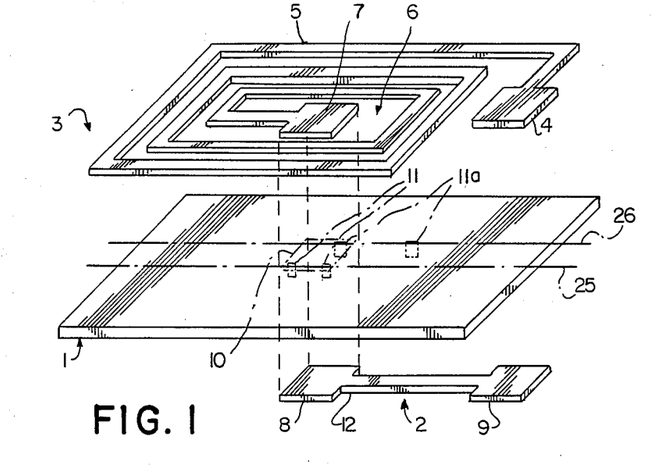
FIG. 1 shows a resonance label according to the invention in an exploded perspective view.

The resonance label shown in exploded form in FIG. 1 has a dielectric base layer 1, on one side of which is first conducting layer 2 is mounted while on the other, opposite, side thereof a second conducting layer 3 is mounted. The method of mounting and the pattern, in particular of layer 3, can be conventional and therefore need not be described in detail here.

To describe its function, it suffices to mention that the second conducting layer 3 has a contact plate 4 and a winding forming an inductor 5 which enclose a free space 6. The free space 6 is, however, reduced in size by a capacitor plate 7 connected to the inductor 5.

Exactly opposite the capacitor plate 7, the conducting layer 2 has a corresponding capacitor plate 8 which is likewise connected to a contact tag 9. Inductor 5 and capacitor 7, 8 together form an oscillating circuit of a predetermined resonance frequency, in known manner. The dielectric layer 1 serves as the dielectric which also determines the frequency and separates the two capacitor plates 7, 8 from one another in a region 10. The contact plates 4, 9 are advantageously connected to one another by crimping.

The parts described above are of a conventional nature and may in principle be modified as desired. However, in departure from the prior art the insulating layer 1 has at least one continuous hole 11 in an area in which the two conducting layers 2, 3 are juxtaposed. This may furthermore be in the area of the (with regard to FIG. 1) right windings of the inductor 5 on the one hand and in the region of the web 12 connecting the capacitor plate 8 to the contact plate 9, on the other hand. Preferably, however, the hole 11 is arranged in the region 10 between the capacitor plates 7 and 8.

It may also be mentioned here that, instead of a plurality of holes 11, it is also possible to provide only one hole; however, to avoid a strong effect on the Q factor, it is advantageous to prevent the total cross-sectional area formed by all the holes from becoming too large. However, it is precisely in the case of such perforations that it is much easier to keep the area occupied by these perforations small than in the case of embossing. The hole diagonal (i.e. in the case of a circular hole, the diameter) is therefore advantageously less than 1 mm and preferably equal to or less than about 0.5 mm. In practice, however, it is possible to manage with much smaller diameter of the hole 11; a hole diameter of 0.1 mm is sufficient, in most cases from 10 to 20 $\mu$m. These diameters correspond to a hole area of not more than 0.75 mm$^2$, in particular not more than 0.3 mm$^2$. Values of 0.0003 to 0.0006 mm$^2$ are completely realistic.

These dimensions play a particularly important role when the continuous hole is in the form of an incision 11a which is negligibly narrow in breadth, so that the longitudinal dimension can be correspondingly larger in order to reach the above-mentioned hole areas. In many cases, a cut will be advisable for production-related reasons since it can be produced relatively easily using a knife roll. If desired, it may also run transverse to the longitudinal direction shown in FIG. 1, although the illustrated alignment of the cuts 11a in the longitudinal direction of the label band (further labels are connected to the left and right prior to separation of the individual labels) is preferred.

As shown in FIG. 1, the holes 11 or the cuts 11a run along dash-dot lines 25, 26, along which they are repeated periodically, in conformity with an advantageous embodiment. The reason for this will be explained below. However, it may be mentioned here that the holes 11 or 11a have no disadvantages at all in those regions in which a conducting layer 2 or 3 on one side of the dielectric layer 1 has no conducting layer opposite on the other side, but that the production is facilitated by this arrangement, as will be shown below.

It is of course also possible, despite the fact that the hole diameter is kept small, to increase the total cross-sectional area by providing a plurality of such holes 11 (see FIG. 1), for example 2 or 3, which restriction is also advisable with a view to retaining sufficient label strength. In this case, however, it is advantageous if the distance between adjacent holes is not chosen too small. It has been found that a distance of 3 mm tends to be the lowermost limit, 5 mm being preferred. A distance of 10 mm is particularly advisable. It is clear that in this case it is not possible to accommodate all holes in region 10 and hence at least one must be arranged between inductor 5 and web 12, unless the capacitor 7, 8 is large enough to accommodate two such holes on its diagonals.

Of course, the invention is in no way restricted to the embodiment shown since it would also be possible first to apply a conducting layer 3 and then—after applying a relatively small insulating layer—to apply a layer 2 on a base layer, on one side. In each case, however, the deactivating surge current, which—as mentioned above—can be considerably smaller than previously, produces a conducting lining inside the hole, which lining permanently connects the two conducting layers 2, 3 to one another so that false alarms due to breaking of the short-circuit created are prevented.

Figure 2:
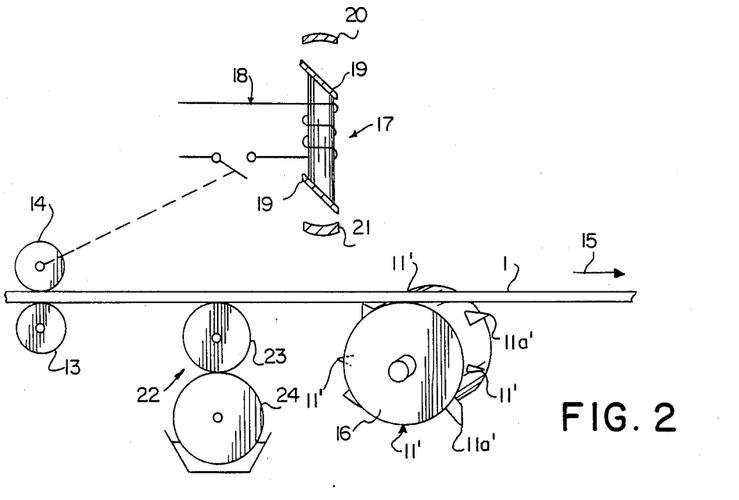
FIG. 2 shows a scheme for illustrating the process according to the invention and an apparatus for carrying out this process, in side view, and a perspective view of a needle roll or knife roll.

FIG. 2 shows, in a single drawing, two different possibilities for introducing the holes according to the invention into the dielectric layer 1. Although this can also be done after application of the conducting layers 2, 3 (FIG. 1), it is preferably carried out before these are applied, in order also to avoid the problems mentioned at the outset in connection with the prior art, where the conducting layer does not cover the incision.

The dielectric layer 1 is drawn between a pair of rolls 13, 14 in the direction of the arrow 15, to be subsequently (not shown) fed for further processing (for example application of the conducting layers) or simply for being rolled up.

However, regardless of the arrangement at the right end of FIG. 2, it is advantageously designed so that the insulating layer is kept under tension, because this facilitates perforation. Perforation can be carried out in various ways, for example also by a punch process, although the required smallness of the hole diameter presents considerable difficulty. Moreover, such resonance labels are mass-produced articles which have to be produced inexpensively. It has therefore proven particularly simple and advantageous to use a knife or needle roll 16 for perforation.

The knife and needle roll 16 (for the sake of simplicity, the term "needle roll" will generally be used in this description) has a peripheral roll of needles 11' which produce the holes 11 (FIG. 1) and—axially displaced by the distance of the lines 25, 26—a roll of blades 11a' which have a point at the leading edge, with which point the said blades make an incision in the dielectric layer 1 in order subsequently to cut it open to give a slot 11a (FIG. 1). However, it may also be advantageous if the blades 11a' are semicircular instead of having a pointed shape. In the case of a roll 16 equipped merely with blades 11a', it may be advantageous to allow the roll to run at a somewhat higher speed than the feed of the dielectric layer 1, so that the blades 11a' completely slit the foil. If necessary, a counter-roll to roll 16 can be arranged on the opposite side of the insulating layer 1, as described subsequently with reference to FIG. 4. Alternatively, and for producing particularly fine holes, a laser 17 can be provided, for example a ruby laser or $CO_2$ laser, which is supplied with pump energy, for example, via a circuit 18. To produce laser spikes for the individual holes 11 (FIG. 1), this circuit 18 may be synchronized with a feed roll 14 to ensure uniform spacings of the holes 11 for a sequence of labels. Otherwise, the laser 17 is merely shown schematically with its two Brewster plates 19, a concave mirror (20) completely coated with a reflective coating, and a glass 21 partially coated with a reflective coating. If the laser beam has parameters according to the invention, it does not penetrate the conducting layer, for example the aluminum, but is reflected by this through the already burned hole, with the result that additional heating of the dielectric takes place, the dielectric then shrinking slightly and forming an ideal sparking space.

It has already been mentioned above that, although it is possible for perforation not to be carried out until after application of the conducting layers 2, 3, it is preferable to provide the hole 11 (FIG. 1) only in the dielectric layer 1. If only one hole 11 is provided, this is advantageously formed, as shown in FIG. 1, in the central region of a capacitor surface 7, 8, since in this case small imprecisions in positioning are not so important.

However, this positioning problem can, for example, be solved very simply by the technique familiar from general label technology, by impressing a mark, for example with the aid of a printing press 22 with printing roll 23 and inking roll 24, the said mark being easily locatable in a conventional manner with the aid of a light beam and a photoelectric converter which picks up the reflected light of this beam. In theory, it would even be possible for the hole itself to be photoelectric, so that there would be no need at all for a mark.

Relative to the width of the dielectric layer 1 running slower than the needle roll, the needle roll 16 is positioned at the point at which the capacitor plates 7, 8 lie or are subsequently to be formed. The needles expediently satisfy the conditions stated in claims 4 to 6 and 10.

It can now also be seen the the positioning problem is dispensed with completely if the holes 11 or 11a (FIG. 1) are produced as a series of holes with the aid of one of the cutting apparatuses shown or a knife roll. In this case, it is no longer necessary to exactly locate an individual hole, since the plurality of holes along the lines 25, 26 in FIG. 1 automatically ensures that at least one hole 11 or 11a will be in the region of the capacitor plates 7, 8 and/or inductor 5 and web 12. It is merely expedient if the series of holes 25, 26 are located in the region of the capacitor plates 7, 8, i.e. it is also advantageous if the cutting direction, as shown in FIG. 2, is in the longitudinal direction of the label band.

Figure 3:
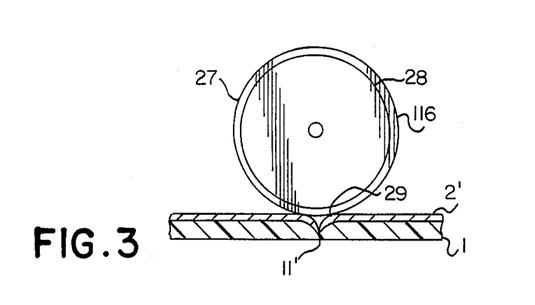
FIG. 3 and 4 show two embodiments of the aforementioned scheme.

FIG. 3 shows the situation at a subsequent time in the production process for the resonance labels. The base layer feeding rolls 13, 14 are not shown. Likewise is true of the counter-roll which may lie opposite the needle roll 116.

In the production stage shown, the insulating layer 1 is already covered with an aluminum layer 2' (or a layer of another conducting metal), which is intended to become layer 2 with the pattern shown in FIG. 1. For this purpose, it is usual to etch away the surface part of layer 2' which is not required for the pattern and, for this etching process, to print photoresist on the layer 2' in those areas where the layer 2' is to be retained.

The roll 116 achieves both in a single operation, i.e. as a printing roll it is provided with raised areas 27 corresponding to the pattern shown in FIG. 1, and with recessed areas 28 in between. Of course, this representation is purely schematic, the roll being smaller in reality but the layers 1, 2' relatively larger. This printing roll 116 is provided at one point with a raised area 29 which is used for printing an appropriate area of the layer 2' with a photoresist which is intended to define the capacitor plate 7 (FIG. 1) after the etching procedure. Precisely in the region of this raised area 29, the roll 116 has a needle 11' or another perforating tool (for example a blade 11a' FIG. 2), thus ensuring that the hole produced by the needle 11' is made at the correct point, without additional measures.

When the needle 11' penetrates the layers 2' and 1, the layer 2' in the hole area is drawn somewhat into the hole in the manner shown. With new, sharp needles 11', this will be insignificant; however, in the course of the work it may assume large proportions which can then no longer be tolerated.

Figure 4:
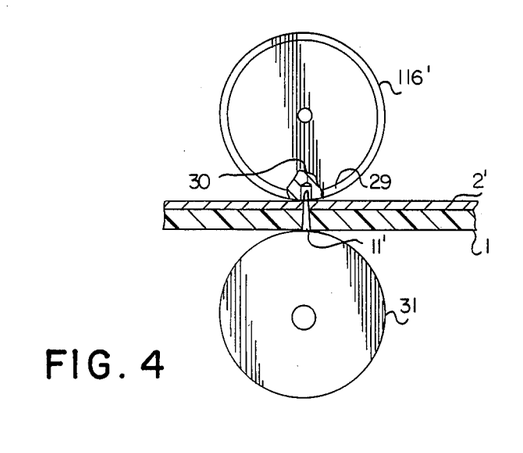

FIG. 4 shows a possible method for preventing the conducting foil from being drawn into the hole. Here, the roll 116' corresponding to the roll 116 has a recess 30 instead of a needle 11'. Against this is a counter-roll 31 opposite the roll 116' (the said roll 31 normally being provided but being omitted in the other figures merely for the sake of simplicity), which carries the needles 11' or the perforating tool. Both rolls 31, 116' are driven synchronously with one another so that, with each rotation of the needles 11', the recess 30 of roll 116' lies opposite, allowing the needle 11' to penetrate through the layers 1, 2'.

Figure 5:
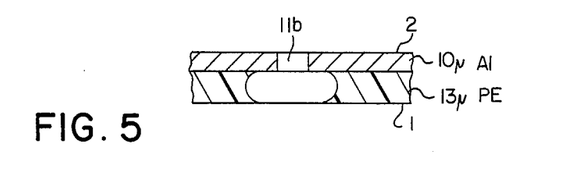
FIG. 5 and 6 show a section through a resonance label during and after its production.
Figure 6:
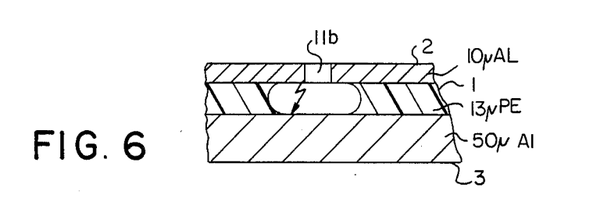

FIG. 5 shows a manufacturing stage in which the hole (11b) has been punched by means of a warm needle, so that the layer 1 of polyethylene has shrunk back and, as shown in FIG. 6, the conducting layers 2 and 3 are opposite one another, although the conducting layer 2 has also been penetrated, facilitating sparking.

The invention furthermore relates to a process in which a dielectric layer is perforated in the course of its production and the conducting layers are applied to both sides afterward.

I claim:

1. A deactivatable resonance label, comprising:
    a dielectric layer having first and second opposed faces;
    a first conducting layer on the first face of the dielectric layer, the first conducting layer being shaped to form an inductor and a first capacitor plate;
    a second conducting layer on the second face of the dielectric layer, the second conducting layer being shaped to form a second capacitor plate, the first and second conducting layers being at least partially superposed, said first and second conducting layers and said dielectric layer forming together an oscillating circuit; and
    shorting means for enabling creation of a short-circuit between the first and second conducting layers when it is desired to deactivate the oscillating circuit, the shorting means being comprised of at least one throughhole passing through the dielectric layer to provide a short circuit path between the first and second conducting layers.

2. The resonance label of claim 1, wherein said at least one throughhole is disposed in said dielectric layer at a location thereof between said first and second capacitor plates.

3. The resonance label of claim 1, wherein said dielectric layer is fabricated of material selected from the group of polypropylene, polystyrene, doubly oriented polypropylene, and doubly oriented polystyrene.

4. The resonance label of claim 3, wherein said dielectric label has a thickness in the range from 9 to 17 micrometers.

5. The resonance label of claim 1, wherein said at least one throughhole comprises a plurality of throughholes and wherein said plurality of throughholes do not penetrate through at least one of said first and second conducting layers.

6. The resonance label of claim 1, wherein said at least one throughhole comprises a plurality of throughholes arranged in a row, said row of throughholes extending beyond the location, on said dielectric layer, of said capacitor plates.

7. The resonance label of claim 6, wherein said plurality of throughholes have a throughhole spacing associated therewith and said throughhole spacing is smaller than a dimension associated with said capacitor plates.

8. The resonance label of claim 1, wherein said at least one throughhole comprises first and second spaced rows of throughholes, the spacing between said first and second rows of throughholes being smaller than the dimension of said capacitor plates along said spacing.

9. The resonance label of claim 1, wherein said at least one throughhole has a hole area of less than about 0.75 mm$^2$.

10. The resonance label of claim 1, wherein said at least one throughhole has a hole area of less than about 0.003 mm$^2$.

11. The resonance label of claim 1, wherein said at least one throughhole has a hole area in the range of 0.003 mm$^2$ to 0.006 mm$^2$.

12. The resonance label of claim 1, wherein said at least one throughhole has a diametrical/ diagonal dimension in the range of 10 to 20 micrometers.

13. The resonance label of claim 1, wherein said dielectric layer constitutes the only layer between said first and second conducting layers.

14. The resonance label of claim 1, wherein said at least one throughhole comprises a slit formed in the dielectric layer.

15. A method for fabricating a deactivatable resonance label, said method comprising the steps of:
    providing a planar dielectric layer having first and second faces;
    forming a first conducting layer on the first face of the dielectric layer, the first conducting layer being shaped to form an inductor and a first capacitor plate;
    forming a second conducting layer on the second face of the dielectric layer, the second conducting layer being shaped to form a second capacitor plate, the first and second conducting layers being at least partially superposed, said first and second conducting layers and said dielectric layer forming together an oscillating circuit; and
    forming shorting means in the dielectric layer for enabling creation of a short-circuit between the first and second conducting layers when it is desired to activate the oscillating circuit, the shorting means being comprised of at least one throughhole passing through the dielectric layer to provide a short circuit path between the first and second conducting layers.

16. A process as in claim 15, wherein said at least one throughhole is formed in said dielectric layer prior to the forming of one of the first and second conducting layers thereon.

17. A process as in claim 15, further comprising maintaining the dielectric layer under tension during forming of the at least one throughhole therein.

18. A process as in claim 15, wherein said at least one throughhole is formed by means of a needle roll which carries at least one row of needles over the periphery thereof.

19. A process as in claim 18, wherein the needle roll contains two rows of spaced needles and the distance between needles in the same row is smaller than the size of the first and second capacitor plates in the rolling direction of the needle roll and the spacing between the two rows of needles is smaller than the size of the capacitor plates in the same direction.

20. A process as in claim 15, wherein the at least one throughhole is formed by means of a punch press having at least one needle.

21. A process as in claim 18, wherein the needles are maintained at a temperature of 290° to 350° C. during formation of the at least one throughhole.

22. A process as in claim 18, wherein the needles are maintained at a temperature in the range of 310° to 330° C. and the needles are coated with a heat resistant layer.

23. A process as in claim 15, wherein the at least one throughhole is formed by means of a laser beam.

24. A process as in claim 22, wherein said laser beam is digitally controlled and has an energy sufficient to penetrate only through the dielectric layer.

* * * * *

UNITED STATES PATENT AND TRADEMARK OFFICE
CERTIFICATE OF CORRECTION

PATENT NO. : 4,876,555  
DATED : October 24, 1989  
INVENTOR(S) : Jorgensen

Page 1 of 1

It is certified that error appears in the above-identified patent and that said Letters Patent is hereby corrected as shown below:

<u>Column 8,</u>  
Line 51, please delete "activate" and insert -- deactivate -- therefor.

Signed and Sealed this

Twenty-fifth Day of September, 2001

*Attest:*

*Attesting Officer*

NICHOLAS P. GODICI  
*Acting Director of the United States Patent and Trademark Office*

REEXAMINATION CERTIFICATE (2639th)

United States Patent [19]

Jorgensen

[11] B1 4,876,555

[45] Certificate Issued Jul. 25, 1995

[54] RESONANCE LABEL AND METHOD FOR ITS FABRICATION

[75] Inventor: Paul R. Jorgensen, Almunecar, Spain

[73] Assignee: Actron Entwicklungs AG, Risch, Switzerland

Reexamination Request:
No. 90/003,607, Oct. 18, 1994

Reexamination Certificate for:
Patent No.: 4,876,555
Issued: Oct. 24, 1989
Appl. No.: 168,468
Filed: Mar. 15, 1988

[30] Foreign Application Priority Data

Mar. 17, 1987 [CH] Switzerland ............... 1000/87

[51] Int. Cl.⁶ .............. G08B 13/24; H01Q 1/38
[52] U.S. Cl. .................... 343/895; 29/846; 333/175; 340/572
[58] Field of Search .......... 343/700 MS, 895; 340/572; 333/138, 140, 167, 175, 185, 219; 29/846

[56] References Cited

U.S. PATENT DOCUMENTS

| | | | |
|---|---|---|---|
| 3,774,205 | 11/1973 | Smith et al. | 342/44 |
| 3,913,219 | 10/1975 | Lichtblau | 29/592 |
| 4,482,874 | 11/1984 | Rubertus et al. | 333/185 |
| 4,555,291 | 11/1985 | Tait et al. | 156/250 |
| 4,578,654 | 3/1986 | Tait | 333/175 |
| 4,598,276 | 7/1986 | Tait | 340/572 |
| 4,689,636 | 8/1987 | Tait et al. | 343/895 |
| 4,752,680 | 6/1988 | Larsson | 235/492 |
| 4,783,646 | 11/1988 | Matsuzaki | 340/572 |
| 4,876,555 | 10/1989 | Jorgensen | 343/895 |

OTHER PUBLICATIONS

"The Radio Amateur's Handbook", Headquarters Staff of the American Radio Relay League, 53rd ed., 1976, pp. 23, 24.

Primary Examiner—Michael C. Wimer

[57] ABSTRACT

For carrying out the deactivation at a lower current and with greater reliability, at least one continuous hole (11) which can be made, for example, by means of a needle roll is provided in the insulating layer (1) of a resonance label in the region (10) between two conducting layers (2, 3).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-24 is confirmed.

* * * * *